March 26, 1968 — R. D. RUGGLES ET AL — 3,374,843
ELEVATING SCALES
Filed Feb. 18, 1965 — 2 Sheets-Sheet 1
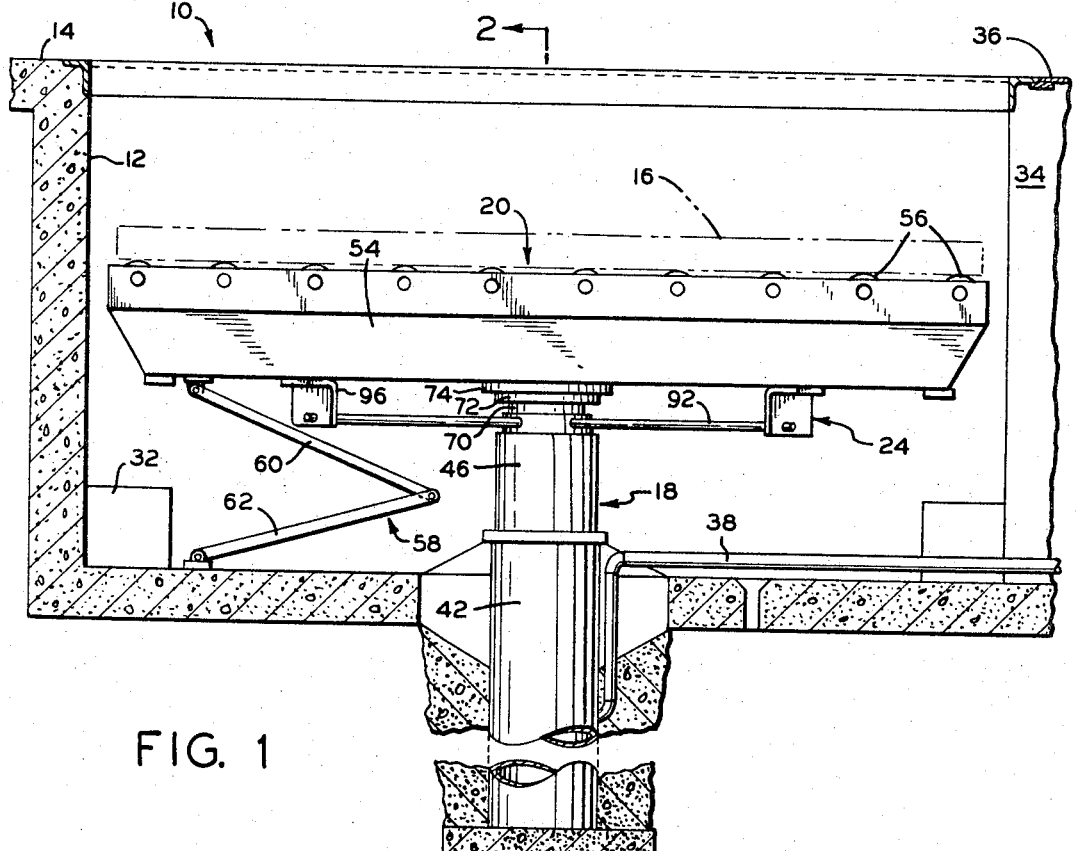
FIG. 1
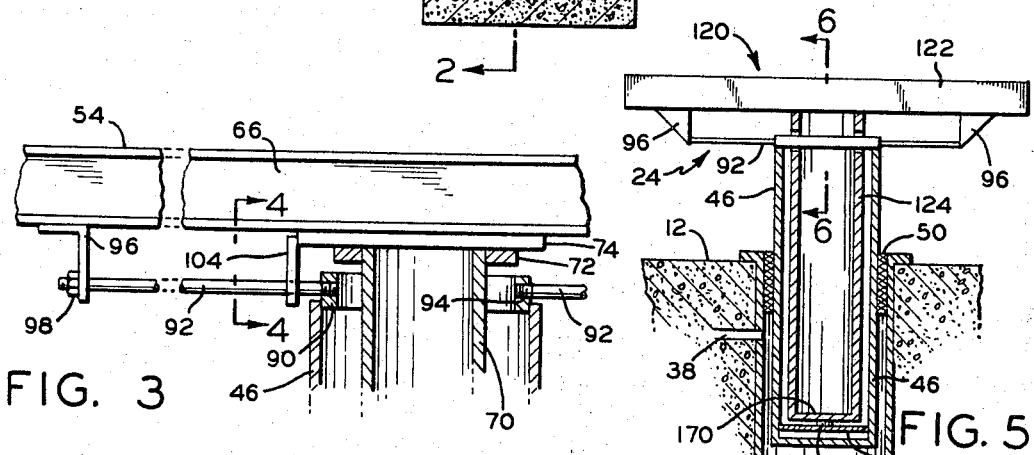
FIG. 3
FIG. 5
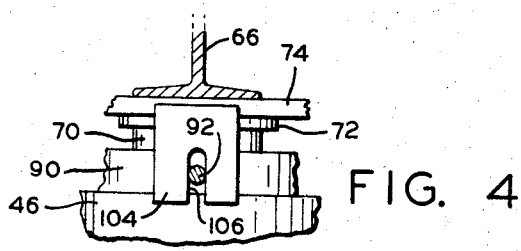
FIG. 4
INVENTORS.
ROBERT D. RUGGLES
FRANK B. CARDER
BY
ATTORNEY.

March 26, 1968 R. D. RUGGLES ET AL 3,374,843
ELEVATING SCALES
Filed Feb. 18, 1965 2 Sheets-Sheet 2

INVENTORS.
ROBERT D. RUGGLES
FRANK B. CARDER
BY J. Dennis Malone
ATTORNEY.

United States Patent Office 3,374,843
Patented Mar. 26, 1968

3,374,843
ELEVATING SCALES
Robert D. Ruggles, Weston, and Frank B. Carder, Darien, Conn., assignors to Dorr-Oliver Incorporated, Stamford, Conn., a corporation of Delaware
Filed Feb. 18, 1965, Ser. No. 433,592
11 Claims. (Cl. 177—1)

This invention relates to weighing scales having elevating platforms. More specifically, the invention pertains to elevating or lift scales useful in palletizing aircraft cargo loads and to operating methods utilizing such scales.

Current air cargo handling techniques require assembly of typically small cargo packages into large palletized loads to facilitate rapid and efficient loading of aircraft. These palletized loads are built up to such a height that personnel loading the pallet cannot reasonably assemble the entire palletized load from one loading level. In order to facilitate this palletizing operation, the present invention provides a pallet supporting platform which can be raised to a convenient working level above the floor to permit loading of the lower cargo levels. The floor below the pallet platform is recessed so that the platform can be gradually lowered to positions below the floor to provide convenient access for loading the uppermost cargo levels.

As the cargo pallet is being built up, it is desirable to have continuous readings of the total weight of pallet and load since the maximum weight may be limited by aircraft carrying capacity and by aircraft weight and balance considerations. In order to provide this load read-out capability, the present invention incorporates a load cell in such manner that it supports and measures the entire weight of the loaded pallet.

To accomplish these lifting and weighing functions, the present invention incorporates a substantially flat platform to receive a cargo pallet. A lifting mechanism such as a hydraulic ram assembly having a substantial vertical rise is positioned in the recess or pit below the platform. The aforementioned load cell is incorporated in the structure on the vertical, central axis of the lift scale to transmit vertical forces from the platform to the hydraulic ram. An elongated stabilizing member rigidly connected to the platform extends down into the ram. Connecting structures capable of transmitting only horizontal forces join the platform and its depending member to the ram at its upper and lower ends. The connecting structures prevent horizontal motion between the ram and the platform assembly and prevent imposition of horizontal forces on the load cell. Further, the length of the depending stabilizing member provides a sufficient vertical moment arm so that horizontal forces applied to the platform assembly from the ram will be sufficient to balance tipping moments created by off-center pallet loads.

In accordance with the invention as thus described, the objects of the present invention include:

(1) The provision of improved lift scales for use in elevating and continuously weighing cargo loads in palletizing operations.

(2) The provision of improved lift scales wherein a weighing platform is supported vertically by a single load cell and is supported horiontally by connecting structures which are incapable of transmitting significant vertical forces.

(3) The provision of improved lift scales elevated by hydraulic rams.

(4) The provision of platform lift scales which are supported by a single load cell positioned adjacent the platform to facilitate access thereto.

(5) The provision of improved methods of palletizing air cargo loads by selectively elevating partially loaded pallets while providing continual weight readings.

(6) And the provision of improved methods of supporting an elevating platform to obtain accurate weight readings thereof.

These and other objects of the present invention will become more fully apparent from the following description and appended claims when read in conjunction with the accompanying drawings wherein:

FIGURE 1 is a partially sectioned schematic side view of a lift scale according to the present invention.

FIGURE 3 is a fragmentary vertical section showing in detail a portion of the lift scale of FIGURE 1.

FIGURE 4 is a fragmentary vertical section taken substantially on line 4—4 of FIGURE 3.

FIGURE 5 is a diagrammatic vertical section showing a modified embodiment of a lift scale according to the present invention.

Figure 2:
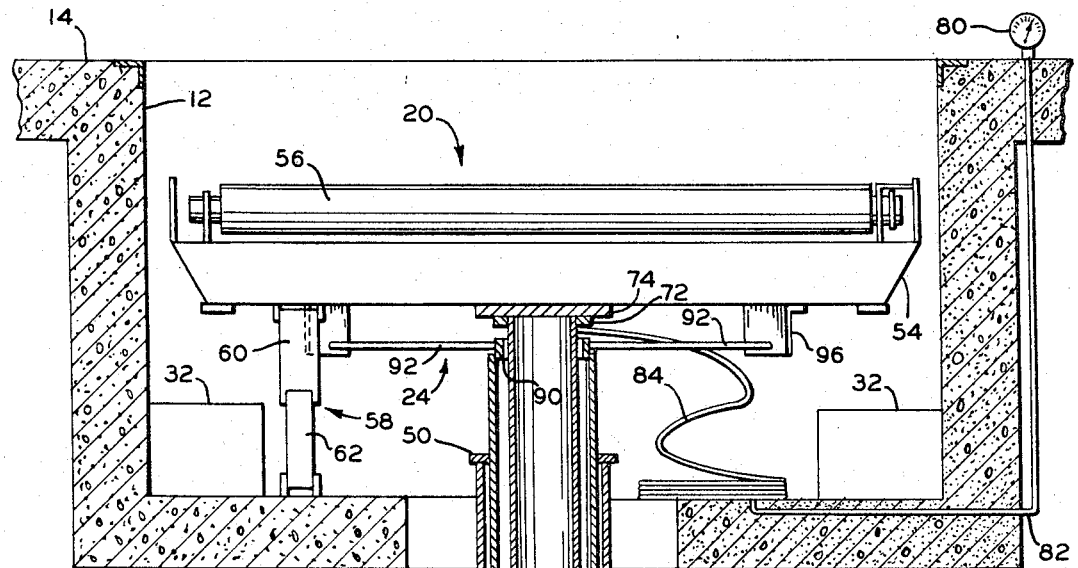
FIGURE 2 is a partial vertical section of the lift scale taken substantially on line 2—2 of FIGURE 1.

Referring now to the drawings in greater detail, FIGURES 1 to 4 show one embodiment of a lift scale 10 according to the present invention which is adapted to support a pallet at any desired elevational position in a palletizing operation while at the same time providing continuous weight readings of the load. The major components necessary to accomplish these functions are briefly described as follows.

In the preferred embodiment, a recess or pit 12 of appropriate conventional construction is provided in a floor 14 of a pallet build-up area. Pit 12 is necessary to permit a pallet 16 and load thereon (not shown) to be lowered below the floor level so that the uppermost levels of the load are conveniently accessible to the loading personnel. A lifting mechanism 18, which in the preferred embodiment is a hydraulic ram assembly, is installed in the bottom of pit 12 to provide the elevating capabilities of the lift scale. A platform assembly 20 mounted upon ram assembly 18 supports pallet 16 and the cargo load. A weighing mechanism 22 (FIGURE 2) is incorporated in the structure of the lift scale between ram assembly 18 and platform assembly 20 to transmit and measure the vertical load therebetween. Connecting structures 24 and 25 are also provided between ram assembly 18 and platform assembly 20, but they transmit only horizontal forces and thus keep the platform assembly upright and in fixed horizontal relation to the ram thereby isolating all horizontal forces from weighing mechanism 22.

Considering these major components of lift scale 10 in greater detail, pit 12 incorporates stop blocks 32 which limit the downward travel of platform assembly 20 and support it in its lowermost position. Pit 12 includes, in the preferred embodiment, an extension 34 (FIGURE 1) which is suitably closed over by a cover plate 36 and houses the conventional hydraulic equipment (not shown) which is necessary for the operation of hydraulic ram assembly 18. Such equipment is connected to the ram assembly by conduit 38.

Hydraulic ram assembly 18 is installed in the bottom of pit 12 in a suitable but conventional technique so as to withstand the considerable loads involved in a typical lift scale installation. (For example, a representative load on a lift scale for air cargo pallets is 10,000 pounds.) The ram assembly includes a cylinder 42 (FIGURE 2) closed at its lower end by plate 44 secured in pressure tight relation to the cylinder. A tubular piston or ram 46 is fitted within cylinder 42, and the ram is closed at its lower end by a transverse wall 48 integral with the ram. A pressure seal 50 at the top of the cylinder seals with the outer cylindrical surface of the ram. Pressure conduit 38 from the hydraulic pumping equipment is connected to cylinder 42 and supplies hydraulic fluid to the space within the cylinder around and below the tubular ram.

Platform assembly 20 includes a platform 54 which in the preferred embodiment is structurally made up of I-beams 66 (FIGURE 3) and has a plurality of horizontal rollers 56, a portion of which may be power driven, suitably mounted thereon to facilitate movement of a pallet and its load on and off the lift scale. Platform 54 is guided in its up and down motion within pit 12 by a non-rotator 58 which serves to prevent rotation of the platform with respect to the pit. Non-rotator 58 in the preferred embodiment is a two-member linkage having an upper link 60 pivotally connected to platform 54 at a point removed from the vertical axis of the ram assembly. A lower link 62 is pivoted at one end to the free end of upper link 60 and is pivotally secured at its other end to the floor of pit 12.

Platform assembly 20 further includes a depending stabilizing member or weight bar 70 (FIGURE 2) which in the preferred embodiment is a tube. A flange-like ring 72 is welded to the upper end of the tube. The ring is rigidly secured to a platform plate 74 by a plurality of circumferentially spaced vertical bolts (not shown) which extend through the plate and the ring. Other securing techniques such as welding could, of course, be used. Plate 74 is rigidly secured as by welding to the lower flanges of I-beams 66 of the platform. Weigh bar 70 extends downwardly from platform 54 into the upwardly-open ram 46. Weigh bar 70 terminates at its lower end in a bearing plate 75 rigidly secured thereto as by welding.

A load cell 76 of load measuring device 22 is positioned within the ram directly below bearing plate 75 of the weigh bar and in turn is supported upon a ram reinforcing plate 78 mounted adjacent to lower end wall 48 of the ram. Load cell 76 is connected to a weight indicating device 80 (FIGURE 2) located at a convenient position in the pallet loading area by conduits 82 and 84. Conduit 84 is flexible and arranged so as to accommodate the vertical motion of the platform assembly. Conduit 84 includes a portion (not shown) extending from the open upper end of the ram down the length of weight bar 70 to connect with the load cell. As the detailed construction of suitable hydraulic, electronic, or pneumatic load cells is known and forms no part of the present invention, the cell is not described in detail herein.

The structure as thus far described accomplishes a vertical transmission of the load from the pallet to the platform, to the depending weigh bar, through the load cell, to the bottom of the ram where it is supported by hydraulic pressure within cylinder 42. However, if the platform assembly 20 and its depending weigh bar 70 were not horizontally restrained in relation to the ram, any asymmetric load on the pallet would cause the platform assembly to tip with respect to the ram. Therefore, connecting structures 24 and 25 are provided to prevent such tipping and to rigidly establish the horizontal position of the weight bar with respect to the ram and thus isolate horizontal forces from the load cell. In the preferred embodiment, connecting structure 24 at the upper end of the ram includes a stay ring 90 (FIGURES 2 and 3) rigidly secured as by welding to the upper end of ram 46. Radially extending stay bars 92 are secured to ring 90 as by threaded connections 94 and extend outwardly therefrom to brackets 96 which are rigidly secured to the lower portion of platform 54. Stay bars 92 extend through brackets 96 and are secured thereto by nuts 98 so as to subject the stay bars to tension loads only. By the radial arrangement of a plurality of stay bars, four in the preferred embodiment, such a tensile mounting arrangement of the bars prevents horizontal motion between platform 54 and ram 46. As stay bars 92 are oriented horizontally and are of substantial length, they are incapable of transmitting any significant vertical forces between the platform assembly and the ram.

Connecting structure 25 at the lower end of the ram is positioned internally of the ram adjacent the lower end of weigh bar 70. In the embodiment shown in FIGURES 1 to 4, this structure is a linear ball bearing arrangement 100 having a circumferentially arranged series of ball bearings which roll between an internal cylindrical surface associated with the ram and an external cylindrical surface associated with the weigh bar. Such a bearing assembly is conventional and is therefore not described or shown in great detail. Bearing arrangement 100 is capable of transmitting horizontal forces between the ram and the lower end of the weigh bar and therefore prevents horizontal motion therebetween but is incapable of transmitting any significant vertical forces.

Finally, in order to prevent any rotational motion of the hydraulic ram with respect to the weigh bar, which motion would produce undesirable torsional stresses upon the load cell, an anti-twist structure is provided. As shown in FIGURES 3 and 4, this structure in one embodiment includes at least one plate 104 secured to and depending from platform assembly 20. Plate 104 has a vertical slot 106 therein which fits with close clearance over a stay bar 92 adjacent its threaded end 94 thereby restricting rotational motion between the platform and the ram.

Operation of the embodiment FIGURES 1 to 4 is readily apparent from the above description. That is, a pallet 16 to be loaded on the lift scale is positioned on rollers of platform assembly 20, the latter being in a raised elevational position for convenience in loading the first or lowest levels of the palletized load. As the pallet is loaded, the weight of the load is supported vertically entirely by the load cell through the depending weigh bar 70 of the platform assembly, and any horizontal loads applied to the pallet or to the platform are transmitted directly to ram 46 by the horizontal-force-transmitting connecting structures 24 and 25. Such horizontal forces are thus isolated from load cell 76 and consequently do not interfere with the accuracy of the continuous weight readings indicated on page 80. As the pallet load increases in height, the platform is selectively lowered into pit 12 to keep the loading level at a convenient elevation. The load cell is subject to a slight, load-induced compressive strain, which exemplarily may be but a few thousandths of an inch. This vertical motion between platform assembly 20 and ram 46 is freely permitted by the upper and lower connecting structures 24 and 25. Thus, with a single load cell, the structure of the present invention produces accurate and continuous weight readings throughout loading operations at all elevational positions of the platform.

Figure 6:
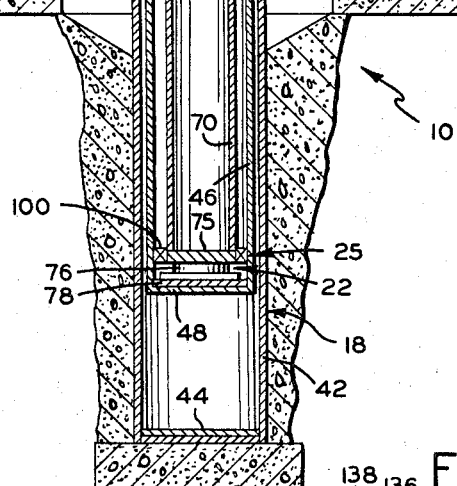
FIGURE 6 is a fragmentary vertical section showing in detail a portion of the lift scale of FIGURE 5.
Figure 7:
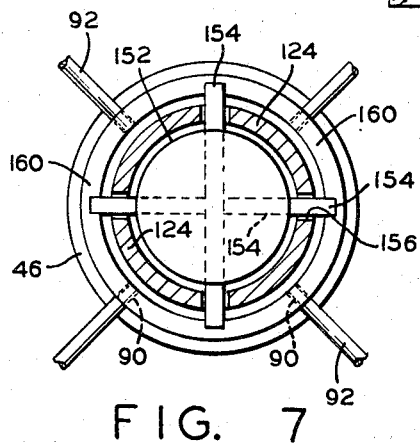
FIGURE 7 is a fragmentary horizontal section taken substantially on line 7—7 of FIGURE 6.

As shown in FIGURES 5 to 7, a modified embodiment of the present invention has a load cell positioned adjacent the platform of the lift scale thereby facilitating access to the load cell for adjustment or maintenance. As the embodiment of FIGURES 5 to 7 differs from the previous embodiment primarily in the mounting arrangements for the load cell and in the interconnections between the platform assembly and the ram, the description will be directed to these details. Elements common to both embodiments are denominated with the same reference numerals. As in the embodiment of FIGURES 1 to 4, ram assembly 18 is provided in the bottom of pit 12. Ram cylinder 42 is supplied with hydraulic fluid through conduit 38 and is sealed with respect to ram 46 by pressure seal 50.

Platform assembly 120 of this embodiment includes a platform 122 and a depending stabilizing member 124 which is preferably a tube rigidly secured to the platform. Platform 122 has as its basic structure a plurality of radiating I-beams 126 (FIGURE 6) rigidly secured as by welding to a centrally located box-like or tube-like center structure 128 having open upper and lower ends. Platform 122 is rigidly secured to depending stabilizing member or tube 124 by through bolts 130 extending through the lower flanges of I-beams 126 and through a flange-like portion 132 at the upper end of stabilizing tube 124.

The upper end of platform center structure 128 is normally covered by a load-transmitting plate 136 secured to the upper flanges of I-beams 126 by through bolts 138. A platform spacer assembly 140 comprising crossed vertical plates 142 and a lower load-transmission plate 144 is secured as by welding to the lower side of cover plate 136. A load cell 148 is positioned under platform spacer assembly 140 and in turn is supported upon a ram spider assembly 150. This latter spider assembly comprises a load receiving plate 152 supported on vertical, crossed spider plates 154 which extend radially outwardly through suitable slots 156 provided in the upper end of stabilizing member 124 (FIGURES 6 and 7). At their outer end spider plates 154 are rigidly secured to a ram ring or stabilizing ring 160 which in turn is rigidly secured by welding to ram 46. In this manner the weight from the loaded pallet is transferred from platform 122, to cover plate 136, to platform spacer assembly 140, through load cell 148, to ram spider assembly 150, and finally to the hydraulically supported ram 46.

To support platform 122 for applied horizontal forces and/or asymmetric loads, horizontal-force-transmitting connecting structures are provided between the platform assembly and the ram. At the upper end of the ram, this structure is similar to that shown in the embodiments of FIGURES 1 to 4 and includes platform brackets 96 and stay bars 92 threadedly connected to ram ring 160. However, as shown in FIGURE 5, this embodiment utilizes at the lower end of the ram a flexible plate 166 which is centrally connected at 168 to the lower end 170 of stabilizing member 124. The periphery of flexible plate 166 bears against the inside surface of ram 46. Thus plate 166 is capable of transmitting horizontal forces between stabilizing member 124 and the ram and keeps the lower end of the stabilizing member centered within the ram. However, because of the vertical flexibility of the center of plate 166 with respect to its periphery, no significant vertical forces are transmitted by the plate.

Therefore, as in the first embodiment, connecting structures 24 and 166 of FIGURES 5 to 7 isolate the load cell from undesirable or destructive horizontal forces but cannot interfere with the accuracy of the load cell in determining the total vertical force applied to the ram.

In this embodiment, predetermined clearances between ram spider plates 154 and their respective slots 156 in the platform assembly will limit rotational motion therebetween so as to avoid detrimental torsional stresses in the load cell.

In operation, the embodiment of FIGURES 5 to 7 is substantially the same as that of the first embodiment except that, as mentioned above, the vertical load is applied from the load cell to the top of the ram rather than to the bottom of the ram as in the first embodiment. Therefore, in this embodiment the ram and not the depending platform member carries the vertical load down to the bottom of the ram where it is supported by hydraulic pressure. In this embodiment the long depending platform stabilizing tube 124 serves to increase the moment arm between the points of application of horizontal force from stay bars 92 and flexible plate 166 and thereby increases the effectiveness of this stabilizing structure in overcoming moments due to asymmetrical loading of the platform.

This invention may be embodied in other specific forms without departing from spirit or essential characteristics thereof. The present embodiment is therefore to be considered in all respects as illustrative and not restrictive. The scope of the invention is indicated by the appended claims rather than by the foregoing description, and all changes which come within the meaning and range of equivalency of the claims are therefore intended to be embraced therein.

What is claimed and desired to be secured by United States Letters Patent is:

1. A pallet-loading lift scale for use in assembling large palletized cargo loads comprising:
    (a) means defining a recess in the floor of a pallet loading area;
    (b) a pallet-supporting platform adapted to fit within said recess;
    (c) a hydraulic piston assembly in said recess connected to said platform to selectively position said platform in positions above and below the floor level of the loading area;
    (d) and load isolating and measuring means for determining the vertical component of force between said platform and said piston assembly, said load isolating and measuring means including:
        (1) an elongated depending member rigidly secured to said platform and extending longitudinally with respect to said hydraulic piston assembly;
        (2) a plurality of radially extending stay bars horizontally positioned to connect the uppermost end of said piston assembly with said platform to prevent horizontal motion therebetween;
        (3) horizontal force transmitting means positioned between the lower end of said depending platform member and said piston assembly to prevent horizontal motion therebetween;
        (4) and a load cell positioned for through transmission of a vertical force from the platform to said assembly.

2. A lift scale as described in claim 1, said horizontal force transmitting means at the lower end of said depending member being a plurality of circumferentially arranged ball bearings operating between cylindrical surfaces on said member and said piston assembly.

3. A lift scale as described in claim 1, said horizontal force transmitting means at the lower end of said depending member being a vertically flexible, horizontally rigid plate connected to the lower end of said depending member and bearing against said piston assembly.

4. A lift scale comprising:
    (a) a hydraulic ram assembly having a fixed cylinder and a vertically-movable tubular ram having a closed lower end;
    (b) a load receiving means including a platform and a depending, elongated vertical member rigidly secured thereo and positioned within said tubular ram;
    (c) radially-rigid, vertically-flexible means positioned circumferentially of said ram adjacent its upper and lower ends to connect said load-receiving means to said ram to prevent radial movement therebetween;
    (d) a load-measuring cell positioned to transmit vertical force between said load receiving means and said ram;
    (e) and a load indicating device remotely connected to said load cell for indicating the measured load.

5. A lift scale as described in claim 4, said load cell being positioned between the lower end of said depending platform-connected member and the closed lower end of said ram.

6. A lift scale as described in claim 4, said load cell being positioned between said platform and the upper end of said ram.

7. A lift scale as described in claim 4:
    (a) said depending, elongated vertical member being tubular in cross-section and having vertical, circumferentially-spaced-apart slots adjacent its upper end;
    (b) said ram having a load-carrying spider assembly adjacent its upper end with a plurality of arms extending inwardly through said vertical slots to connect with each other centrally within said tubular depending member;
    (c) and said load cell being positioned on top of said spider assembly and directly below and in contact with a central portion of said platform.

8. A lift scale as described in claim 7, said central portion of said platform being removable to facilitate access to said load cell from said platform.

9. A lift scale comprising:
   (a) a ram assembly having a fixed cylinder and a vertically movable tubular ram having a closed lower end;
   (b) a spider secured to said ram at its upper end and having vertically extending apertures opening into the interior of said ram;
   (c) a load cell centrally positioned on said ram spider;
   (d) a load receiving platform positioned upon, and vertically supported by, said load cell;
   (e) horizontally extending, elongated stay bars positioned radially around said ram and connecting the top thereof to portions of said platform remote from the central axis of said ram assembly;
   (f) a depending platform stabilizing member rigidly secured to said platform and extending downwardly through at least a portion of said vertical apertures in said ram spider to a point adjacent the lower end of said ram;
   (g) and vertically-flexible, horizontally-rigid connecting means between the lower ends of said ram and said depending stabilizing member.

10. A weight-determining method of assembling cargo loads upon a pallet comprising the steps of:
    (a) supporting the pallet at a convenient working elevation on a platform structure having a substantial vertical height;
    (b) loading cargo on the pallet to form lower cargo levels thereon;
    (c) lowering the platform structure as the palletized load height increases;
    (d) loading cargo on the pallet to form upper cargo levels;
    (e) applying horizontal stabilizing forces to vertically spaced apart portions of the platform structure throughout said supporting, loading, and lowering steps to balance horizontal forces and tipping moments applied to the platform structure;
    (f) and applying a purely vertical force to the center of the paltform structure with a load measuring cell having means to indicate the load applied.

11. A weight-determining method of assembling cargo loads of substantial vertical height upon a pallet comprising the steps of:
    (a) supporting the pallet at a convenient working elevation on a platform structure;
    (b) loading cargo on the pallet to form the lower cargo levels thereon;
    (c) lowering the platform structure as the palletized load height increases to maintain the convenient working elevation for loading;
    (d) loading additional cargo on the pallet to form the upper cargo levels;
    (e) and throughout said supporting, loading, and lowering steps applying vertical forces to the platform structure with a load measuring device having means to indicate the forces applied whereby the weight of the palletized load is continually measured throughout the load assembly process.

References Cited

UNITED STATES PATENTS

| | | | |
|---|---|---|---|
| 2,477,854 | 8/1949 | Baker | 177—211 X |
| 2,819,612 | 1/1958 | Borgstrom et al. | 177—134 X |
| 2,909,367 | 10/1959 | Goehrig et al. | 177—146 |
| 2,960,328 | 11/1960 | Tate | 177—254 |
| 3,053,050 | 9/1962 | Sommerer | 92—52 X |
| 3,177,958 | 4/1965 | Link | 177—254 X |

RICHARD B. WILKINSON, *Primary Examiner.*

G. H. MILLER, JR., *Assistant Examiner.*